United States Patent

Perrella

[15] 3,654,706

[45] Apr. 11, 1972

[54] EDUCATIONAL DEVICE

[72] Inventor: Donald J. Perrella, 38 Drexell Lane, Matawan, N.J. 07747

[22] Filed: June 23, 1970

[21] Appl. No.: 48,988

Related U.S. Application Data

[63] Continuation-in-part of Ser. No. 657,316, July 31, 1967, abandoned.

[52] U.S. Cl. ............................................. 35/9 D, 35/35 D
[51] Int. Cl. .................................................... G09b 5/00
[58] Field of Search ........................... 35/9 R, 35 D, 31 C

[56] References Cited

UNITED STATES PATENTS

| | | | |
|---|---|---|---|
| 2,539,077 | 1/1951 | Hawkins | 35/9 R X |
| 2,505,230 | 4/1950 | Composto | 35/35 D |
| 3,252,230 | 5/1966 | Donev | 35/35 D X |
| 2,092,577 | 9/1937 | Hornung | 35/9 R |
| 2,872,741 | 2/1959 | Krueger et al. | 35/9 R |

*Primary Examiner*—Wm. H. Grieb

[57] ABSTRACT

This invention relates to an educational device, and particularly to an electrical teaching machine for young children. The inventive device utilizes a plurality of electrically conductive means which bear symbols, such as alphabet letters or mathematical symbols. A conductive path is provided upon correct arrangement of predetermined groups of letters to spell words, or arrangement of predetermined mathematical symbols to perform arithmetic operations. A chassis or housing incorporates electrically responsive means adapted to provide sensory stimulation upon correct arrangement of a plurality of the electrically conductive means.

10 Claims, 7 Drawing Figures

PATENTED APR 11 1972 3,654,706

INVENTOR.
DONALD J. PERRELLA

EDUCATIONAL DEVICE

RELATED APPLICATION

This application is a continuation-in-part of copending application Ser. No. 657,316 filed July 31, 1967 now abandoned.

BACKGROUND OF THE INVENTION

Prior art teaching devices for young children have generally been limited to the teaching of basic and primary skills involving color distinction and shape distinction. While such devices have often been designed with a further view to teaching the alphabet and spelling as well as numbers and simple arithmetic, such achievement was recognized as being highly optimistic and any teaching benefits occasioned thereby were regarded as incidental.

Accordingly, a principal object of the present invention is to provide an educational device which rewards learning with sensory stimulation.

Another object of the invention is to provide an educational device for the primary purpose of spelling and/or arithmetic, the teaching of skills involving color and shape distinction being secondary.

Other objects of the invention will in part be obvious and in part be apparent from the following detailed description of the invention and the drawing.

SUMMARY OF THE INVENTION

This invention relates to an educational device, and particularly, to an electrical teaching instrument for pre-school and kindergarten children, as well as children beginning to attend school for the first time.

The invention contemplates a device wherein the predetermined information-conveying arrangement of symbol-bearing electrically conductive means serves to actuate an electrical system to provide sensory confirmation of the accuracy of such predetermined arrangement. Such confirmation may take the form of visual or auditory stimulus relevant to the information conveyed by the arrangement of the symbol-bearing electrically conductive means.

In its simplest form the inventive educational device may be regarded as a teaching instrument wherein children's alphabet blocks are provided with electric current transmission means. When the alphabet blocks are properly arranged so as to spell a preselected word, an electrical circuit is completed to provide sensory stimulus in the form of a picture of reproduction of the word or a sound illustrative of the word. The device or apparatus comprises a chassis or housing having block-receiving means and incomplete circuit providing means. The seating of alphabet blocks in the block-receiving means in predetermined order so as to spell a word completes an electric circuit and produces the sensory stimulus.

DETAILED DESCRIPTION

The symbol-bearing electrically conductive means of the inventive device may consist of any three-dimensional object so constructed as to provide an electrically conductive path between two points on the surface of the means. The path may be along the surface or through the interior of the means, or partly along the surface and partly through the interior. The arranging of a plurality of means in predetermined order will provide a continuous electrically conductive path through the plurality of electrically conductive means. Seating of such an arrangement of means in the receiving means completes a circuit and actuates sensory stimulus. The construction of the electrically conductive means is such that arrangement of the electrically conductive means in non-predetermined order fails to complete any circuit. Illustrative of such construction is the provision of terminals in different positions on the means. Such terminals can be located in any convenient part of the means. Preferably the electrically conductive means is in the shape of a cube or block having terminals on opposite sides.

The symbol-bearing electrically conductive means are adapted to be disposed in a chassis. When so disposed in predetermined order, two results are effected simultaneously: 1) information is conveyed by the arranging of a plurality of symbol-bearing electrically conductive means in predetermined order, and 2) an electrical circuit is completed to provide a sensory stimulus relevant to the information conveyed by the predetermined arrangement.

The chassis is provided with a plurality of incomplete circuit means which in conjunction with the continuous electrically conductive path, formed by arranging a plurality of symbol-bearing electrically conductive means in predetermined order, form a completed circuit and activate a sensory stimulus. Each predetermined arrangement of symbol-bearing electrically conductive means (or each continuous electrically conductive path) serves to complete a separate, distinct circuit. Each electrically conductive path terminates at a different portion of the chassis where it contacts and completes a separate, distinct incomplete chassis circuit.

Each incomplete chassis circuit is provided with means adapted to provide sensory stimulation. The sensory stimulation so provided is relevant to the information conveyed by the symbol-bearing means when these means are arranged in predetermined order. Expressed somewhat differently the chassis has a plurality of incomplete circuits which terminate at each end of the receiving means and which circuits are completed by the provision of an electrically conductive path bridging or spanning the receiving means.

The receiving means optionally may be provided with divider means to divide the receiving means into a plurality of slots for reception of symbol-bearing means, e.g. blocks. In this eventuality, the divider means will have predetermined conductive and nonconductive areas adapted to transmit the electrically conductive path. The divider means are optional and may be eliminated (not shown as obvious) whereby a symbol-bearing means directly contacts another symbol-bearing means. When arranged in predetermined order, the conductive means of adjacent symbol-bearing means form a continuous electrically conductive path. The essential criterion is that a continuous, electrically conductive path be provided to actuate the picture providing means when a programmed word is correctly spelled. While no limit is set on the number of symbol-bearing means which may be seated in the receiving means, in general, the number will be related to the age group of the students for which the device is provided as a teaching aid. Thus, the number may be relatively small, e.g., three to five, where the students comprise pre-school and first year elementary school children. The receiving means for the symbol-bearing means is not limited to a given arrangement of means and accordingly, may be designed to accommodate symbol-bearing means, e.g., blocks, in horizontal, vertical or diagonal arrangements. It is also contemplated that the design may accommodate a plurality of arrangements, a crossword puzzle design being illustrative thereof.

The sensory stimulation providing means may comprise any means for providing visual stimulation correlated to the predetermined groups of symbols constituting programmed words. Such means may take the form of a viewing screen containing a plurality of pictures which are selectively illuminated upon completion of a circuit. Another form comprises a movable surface, e.g., a rotatable circle, bearing a plurality of pictures and viewing means adapted to expose one of said pictures at a time. The orientation of the pictures and the degree and direction of movement of the surface are coordinated in such manner that actuation causes the viewing means to expose the particular picture which is correlated to the programmed word spelled by the seated arrangement of symbol-bearing means.

In general, the circuitry employed to actuate the sensory stimulating means may take the simple form of wired circuits which transmit signals to current responsive means or the more sophisticated form of wireless circuits which transmit radio signals to appropriate receivers. The sensory stimulating means may function in a manner analogous to that in which a juke-box record is selected or a telephone number is reached by dialing. Regardless of the form of circuitry employed the primary function thereof is to transmit a signal which actuates the means, the latter then functioning to provide a picture correlated to a predetermined word.

DESCRIPTION OF THE DRAWING

Referring more particularly to the drawings accompanying and forming a part of this specification, wherein like reference characters designate like parts.

In FIG. 1 the block 11 is shown bearing on its face a symbol, in the case, the letter "A". Embedded in the block is wire 13 having exterior terminals 13a and 13b.

In FIG. 2 it will be observed that the inventive system comprises block receiving means 10 electrically connected in series with circuit selector means 20 and sensory stimulation means 30.

A plurality of circuits (three are shown solely for sake of illustration are provided between receiving means 10 and sensory stimulation means 30. By means of an electrically conductive path a single specific circuit is selected and completed out of the plurality of possible circuits. In FIG. 2 the completed circuit is shown by the solid line joining element 20 to elements 10 and 30, the two non-selected incomplete circuits being illustrated by dotted lines. Seating of a plurality of blocks to spell, for example, a programmed word, completes the electrical circuit and actuates sensory stimulation means 30 to provide, for example, a selective visual image correlated to the programmed word. In FIG. 3 the electrically conductive path formed by the arrangement of blocks spells the word "cat." The circuit thus completed activates sensory stimulation means 30, to produce a picture 31 of a cat, in a manner to be described subsequently.

The inventive embodiment portrayed schematically in FIG. 3 shows block receiving means 10 with blocks 11 seated therein in predetermined order and separated by optional divider strips 12. As shown in FIGS. 4 and 5 the divider strips are formed of separated conductive areas 12a and non-conductive areas 12b. The conductive areas 12a are located so as to contact a terminal of a block.

Figure 1:
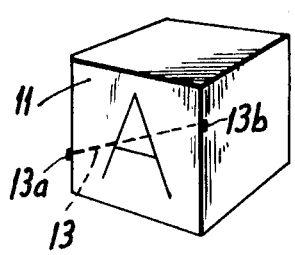
FIG. 1 is a perspective of a block.
Figure 2:
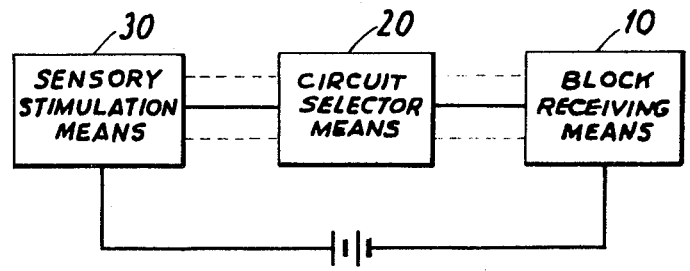
FIG. 2 is a functional block diagram of the inventive system.
Figure 3:
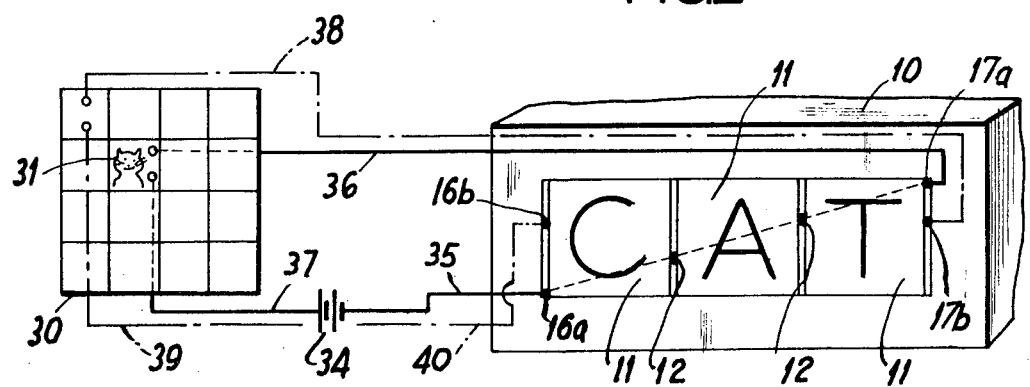
FIG. 3 is a schematic of an embodiment of the inventive system employing visual stimulation means comprising a selectively illuminated grid.
Figure 4:
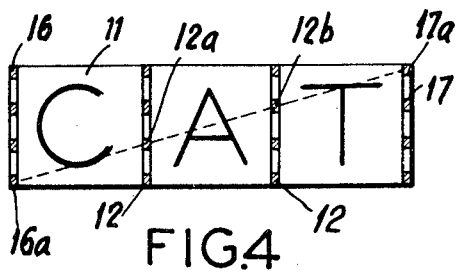
FIGS. 4 and 5 depict in elevation illustrative block arrangements with positioned divider strips.
Figure 5:
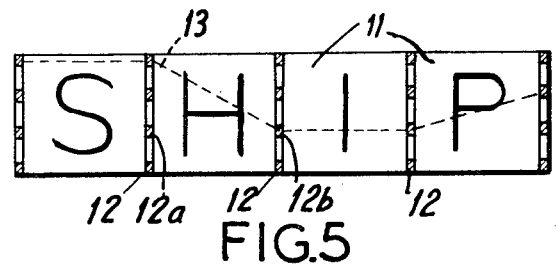

That portion of the chassis adjacent each end of the block receiving means is provided with contact means 16 adapted to bring each electrically conductive path into contact with its appropriate corresponding incomplete chassis circuit. Said means may comprise a member having predetermined conductive and non-conductive areas. The contact means may be similar to divider strips 12 which have alternate conductive areas 12a and non-conductive areas 12b (shown in FIGS. 4 and 5). Alternatively the contact means may comprise holding means (not shown as obvious) which hold the wires of the incomplete chassis circuit in position to contact the left or right terminus of their corresponding electrically conductive path, that is, a terminal of a block. An example of such a holding means is a non-conductive matrix in which the wires of the incomplete chassis circuit are embedded, for example, wires 35, 40, 36 and 38. This predetermined order of blocks forms a continuous electrically conductive path (shown in FIGS. 3, 4 and 5) when the terminals of adjacent individual blocks contact one another either directly or through divider strips and completes the circuit from block receiving means 10 to sensory stimulation means 30. Specifically, as shown in FIGS. 2 and 3, the circuit travels from battery 34 along wire 35 which is attached to conductive area 16a of contact means 16. Area 16a contacts terminal (not shown) of block bearing letter "C." The circuit then travels along the electrically conductive path to conductive area 17a of contact means 17 which is attached to wire 36. Wire 36 in turn is connected to sensory stimulating means, e.g. a bulb (not shown) located in sensory stimulation means 30 behind the portion of means 30 bearing an image of a cat. The sensory stimulating means is connected to battery 34 by wire 37 to complete the circuit. Thus when blocks are arranged to spell the word "cat," the image of a cat is illuminated. As a result a completed circuit actuates sensory stimulation means 30 to provide an illuminated picture 31 correlated to the programmed word spelled by the seated arrangement of blocks 11. Similarly, other circuits are formed by employing different conductive areas of the left contact means 16 and the right contact means 17. Only one such circuit is shown in FIG. 3 for ease of illustration. There the circuit proceeds from battery 34 via wire 40 to conductive area 16b which as shown does not contact a block terminal. If, however, blocks are selected which complete an electrically conductive path from 16b to 17b, the circuit will proceed along wire 38 to a second sensory stimulating means and then along wire 39 to battery 34. While words having three and four letters are shown, words of fewer or more letters may be employed by appropriate adjustment of the block receiving means. The electrically conductive path as well as the balance of the circuit may be provided by copper wires or other conductive means on and/or within blocks 11 in predetermined arrangements.

Figure 6:
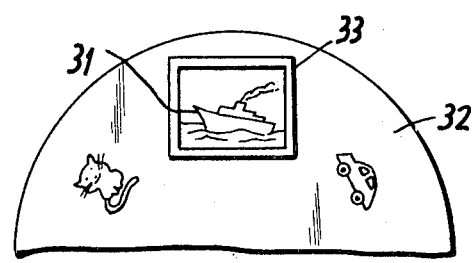
FIG. 6 is a view partly fragmented of an embodiment of a visual stimulation means contemplated by the inventive system which comprises a rotatable picture bearing surface.

The visual stimulation means shown in FIG. 6 comprises a rotatable surface 32 bearing a plurality of pictures in predetermined orientation. A viewing screen 33 is provided and adapted to selectively view said pictures. Actuation of the visual stimulation means causes viewing means 33 to expose the particular picture which is correlated to the programmed word spelled by the seated arrangement of blocks. As shown in FIG. 6 the provision of an illuminated picture 31 is contemplated.

Figure 7:
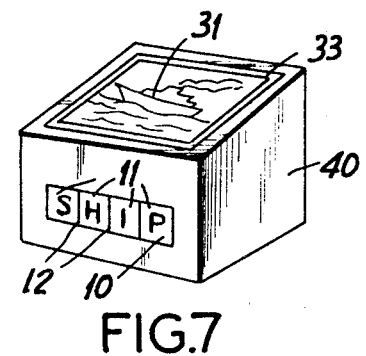
FIG. 7 is a perspective view of an embodiment of the invention as integrally assembled in a chassis.

An embodiment of the inventive educational device is shown in FIG. 7. This embodiment envisions an integral assemblage wherein a chassis 40 is provided with block receiving means 10 in its front side. Seating of blocks 11 therein actuates the contained circuitry to provide illuminated picture 31 exposed by viewing means 33 provided on the beveled top of chassis 40.

While the foregoing summary has described the invention in terms of picture providing means and alphabet blocks, it should be clearly understood that such description is illustrative only and by no means intended as limiting the scope of the invention. In its broadest sense, the invention contemplates the employment of electrically responsive means adapted to provide sensory stimulation correlated to predetermined groups of symbols. The sensory stimulation provided may be visual, as in the projection of a picture or audio, as in the reproduction of a voice or other sound. Symbols exposed by the blocks may be alphabet letters, including foreign alphabet letters, or mathmatical symbols, including numbers and mathematical symbols such as +, , ×, −, =, etc. The shape and size of the blocks is not critical provided all of the blocks have the same shape and size and the block receiving means or grid is adapted to seat the blocks. Thus, the blocks may be cube-shaped or sphere-shaped. The proviso is important in that matching of block size or shape to block receiving means plays no role in the learning process utilizing the invention and therefore does not serve to detract from the rate and level of learning achievement with respect to the discipline sought to be learned.

What is claimed is:

1. An educational device comprising in combination
a plurality of symbol-bearing means, the means adapted to convey an electrical circuit between at least two separated terminals on the surface of the symbol-bearing means, the terminals being so located that disposition of the symbol-bearing means in predetermined order provides a continuous electrically conductive path from the first to the last of the plurality of symbol-bearing means, and conveys information, receiving means adapted to receive the symbol-bearing means, the receiving means having a plurality of terminals, one of the terminals adapted to contact a terminal of the first symbol-bearing means, and another of the terminals adapted to contact a terminal of the last symbol-bearing means, the arranging of symbol-bearing means in predetermined order serving to complete an electrical circuit, the electrical circuit passing from the first to the last of the symbol-bearing means through or on the symbol-bearing means without contacting the receiving means, the receiving means being provided with electrically responsive means to provide sensory stimulation relevant to the information conveyed when the symbols are arranged in predetermined order.

2. An educational device according to claim 1 wherein the symbol-bearing means are substantially in the form of blocks.

3. An educational device according to claim 1 wherein the symbol on the symbol-bearing means is a letter.

4. An educational device according to claim 1 wherein the symbol on the symbol-bearing means is a number.

5. An educational device according to claim 1 wherein the symbol on the symbol-bearing means is an arithmetical sign.

6. An educational device comprising in combination a plurality of symbol-bearing means, the means adapted to convey an electrical circuit between at least two separated terminals on the surface of the symbol-bearing means, the terminals being so located that disposition of the symbol-bearing means in predetermined order provides a continuous electrically conductive path from the first to the last of the plurality of symbol-bearing means, and conveys information, receiving means adapted to receive the symbol-bearing means, the receiving means having a plurality of terminals, one of the terminals adapted to contact a terminal of the first symbol-bearing means, and another of the terminals adapted to contact a terminal of the last symbol-bearing means, the arranging of symbol-bearing means in predetermined order serving to complete an electrical circuit, the receiving means being provided with electrically responsive means to provide sensory stimulation relevant to the information conveyed when the symbols are arranged in predetermined order, wherein the receiving means is provided with at least one divider strip, the divider strip having separate conductive and non-conductive areas, and the divider strip defining an area for receiving an individual symbol-bearing means.

7. An educational device according to claim 6 wherein the symbol-bearing means are substantially in the form of blocks.

8. An educational device according to claim 6 wherein the symbol on the symbol-bearing means is a letter.

9. An educational device according to claim 6 wherein the symbol on the symbol-bearing means is a number.

10. An educational device according to claim 6 wherein the symbol on the symbol-bearing means is an arithmetical sign.

* * * * *